United States Patent
Hong et al.

(10) Patent No.: US 8,239,407 B2
(45) Date of Patent: Aug. 7, 2012

(54) APPARATUS AND METHOD FOR RECOVERING CURSOR POSITION

(75) Inventors: Seokjin Hong, Suwon-si (KR); HeeGyu Jin, Suwon-si (KR); Kyoung-Gu Woo, Seoul (KR); KiYong Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 12/717,554

(22) Filed: Mar. 4, 2010

(65) Prior Publication Data

US 2010/0153362 A1   Jun. 17, 2010

Related U.S. Application Data

(63) Continuation-in-part of application No. 11/936,331, filed on Nov. 7, 2007, now Pat. No. 7,904,441.

(30) Foreign Application Priority Data

May 22, 2007 (KR) .................. 10-2007-0049702

(51) Int. Cl.
G06F 17/00 (2006.01)
(52) U.S. Cl. ........ 707/774; 707/718; 707/720; 707/708; 707/713

(58) Field of Classification Search .................. 707/708, 707/718, 720, 774
See application file for complete search history.

(56) References Cited

U.S. PATENT DOCUMENTS

| | | | |
|---|---|---|---|
| 5,809,331 A | 9/1998 | Staats et al. | |
| 6,009,425 A * | 12/1999 | Mohan | 1/1 |
| 6,606,618 B2 | 8/2003 | Delo | |
| 2004/0254948 A1 * | 12/2004 | Yao | 707/101 |
| 2008/0077558 A1 | 3/2008 | Lawrence et al. | |

FOREIGN PATENT DOCUMENTS

| | | |
|---|---|---|
| JP | 07-234772 A | 9/1995 |
| KR | 10-1997-0049604 A | 7/1997 |
| KR | 10-2004-0060620 A | 7/2004 |
| KR | 10-2007-0003468 A | 1/2007 |

* cited by examiner

*Primary Examiner* — Sana Al Hashemi
(74) *Attorney, Agent, or Firm* — Sughrue Mion, PLLC (57) ABSTRACT

Provided are an apparatus and method for recovering a cursor position without degrading performance of a display apparatus. The apparatus includes: a cursor information storage unit that stores cursor information, which includes position information of a first cursor, in response to a cursor information storage message; and a cursor position recovery unit that recovers a position of a second cursor, which corresponds to the first cursor, by using the stored cursor information in response to a cursor information recovery message.

23 Claims, 11 Drawing Sheets

APPARATUS AND METHOD FOR RECOVERING CURSOR POSITION

PRIORITY STATEMENT

This application is a continuation-in-part application of U.S. application Ser. No. 11/936,331, filed on Nov. 7, 2007, which claims priority from Korean Patent Application No. 10-2007-0049702 filed on May 22, 2007 in the Korean Intellectual Property Office, the disclosure of which is incorporated herein by reference in its entirety.

BACKGROUND

1. Field

The exemplary embodiments relate to an apparatus and method for recovering a cursor position, and more particularly, to an apparatus and method for quickly recovering a cursor position by using a small number of memory accesses.

2. Description of the Related Art

With the trends of fabrication of large-capacity storage devices and the proliferation of digital devices using the same, the amount of content stored in and managed by digital devices is rapidly increasing.

In recent years, not only folder-browse-based user interfaces (UIs) but also content-search-based UIs have been widely adopted, allowing users of digital devices to effectively utilize a large amount of content.

To implement a content-search-based UI, a digital device needs to be capable of managing and retrieving metadata for content stored in the digital device. Accordingly, more recently, there has been a growing trend toward portable digital devices employing a DBMS (Database Management System) having data management and storage capabilities.

The DBMS is a program that allows a plurality of users to record data in a database or to access the database to retrieve information stored in the database by providing environments in which convenient data storage and efficient data management can be achieved. In addition, the DBMS integrates remote data by application program, so that each application program can share the integrated data, enabling systematic utilization of information.

The DBMS performs defining of a collected data structure, gathering data according to data structure, data retrieval and renewal using database languages, simultaneous execution control of data processing by multiple users, returning to the original state in the event of an abnormality occurring while renewing data, management of information security, and so on. A typical DBMS is a Relational Database Management System (RDBMS) that uses a Structured Query Language (SQL) interface.

In the case of a portable digital device having an embedded DBMS performing the above-described functions, users of the portable digital device have requested the capability of recovering a final display in the event of a power interruption.

In a general final-display-recovery process, as a portable digital device is supplied with power, a bootloader is executed to drive an operation system. Once the operation system is driven, data acquisition for outputting a display is performed, and then data is output through a display device. Here, the operations of power supply, driving the operating system, execution of the bootloader, and display outputting are performed irrespective of the amount of data (e.g., common content like music, moving images, or images) stored in the digital device. However, in the data acquisition operation, data required for screen display is acquired by allowing the embedded DBMS to execute queries. In the case where the queries for data acquisition are inappropriately processed, the amount of content (target queries) increases, so that a query processing time may linearly increase.

That is, in the case of data acquisition for final data recovery, a query-processing time increases as the number of records provided as query processing results increases and a cursor is located at a later one of the query processing results.

In a portable digital device having an embedded DBMS that operates normally, predetermined queries are generated for data acquisition so that query processing is performed by the DBMS. Query processing results are accessed by cursor objects. Thus, acquiring data from the normally-operating DBMS means acquiring cursor objects for display output responding to a user input.

That is, in a portable digital device in which power is frequently turned on/off, recovering a final display means recovering a search position of a database when the database search is terminated because a cursor start position when the portable digital device is restarted corresponds to the search position when the database search is terminated.

One approach for recovering a search position is to re-execute a query such that the cursor position is stored by storing query strings. Then, the stored query strings are loaded when recovering the cursor position, thereby creating the cursor. Once the cursor is created, the cursor position is moved sequentially while determining whether the position of the cursor created by loading the query strings is identical with a position of the cursor currently in use, thereby recovering the search position.

Such a search-position-recovery scheme may, however, impose several problems. For example, performance degradation due to cursor position movement may be caused as the stored cursor position becomes distant from the current cursor position. Further, as the amount of content of the target queries increases, the recovery time may increase.

Another approach for recovering a search position is to store query results in a disk prior to power interruption of a portable digital device, and recycle the stored query results when restarting the portable digital device. In the related art, query strings are stored when storing a cursor and a current cursor position is temporarily stored.

For storage of all search results, the cursor is moved to the first cursor position, and search results corresponding to query strings are stored while moving the cursor until the last search result is reached. Once the storage of all search results is completed, the cursor is moved to the current cursor position that is temporarily stored.

Thereafter, when restarting the portable digital device, the search position recovery is performed by loading pre-stored search results stored according to the cursor search results before the cursor is created, and searching for the cursor position based on the loaded search results.

However, this is disadvantageous in that considerable search result storage costs may be involved in a search position storage stage. In order to store all search results in the search position storage stage, data of fields selected while the current cursor is moved throughout all the search results from the first to the last search results should be stored in a separate space. That is, recovery performance is liable to degrade according to the number of times the cursor is moved, the size of data stored, the number of search results, the number of fields selected, and so on.

That is, according to the related art, cursor position storage for final-display recovery and a search position recovery scheme using a re-search method in a search position recovery stage may cause performance degradation due to an increase in the number of times the cursor is moved. Accordingly, as the stored cursor position becomes distant from the first search result, the recovery performance in the search position recovery stage may become very poor. In addition, it is highly probable that the search-position-recovery performance may degrade as the amount of content as target queries.

Still another approach for recovering a search position is to store search results, which also entails several disadvantages. That is, degradation of recovery performance may be caused due to the size of stored data. In addition, an increased number of search results may increase the number of fields selected, which causes an increase in the amount of data stored, unavoidably degrading the performance in the search-position-recovery stage.

The related art search position recovery schemes render severe degradation in the performance in a search position recovery stage (using a re-search method) or a search position storage stage (using stored search results). Accordingly, a methodology is needed for recovering a search position without performance degradation.

SUMMARY

Aspects of the exemplary embodiments provide an apparatus and method for recovering a cursor position using pre-stored cursor information in order to quickly recover a final display.

Aspects of the exemplary embodiments also provide an apparatus and method for recovering a cursor position, by which a cursor position corresponding to a final display can be adjusted even when specified data is inserted, deleted and updated after cursor information is stored.

However, aspects of the exemplary embodiments are not restricted to the one set forth herein. The above and other aspects of the exemplary embodiments will become more apparent to one of ordinary skill in the art to which the exemplary embodiments pertain by referencing the detailed description given below.

According to an exemplary embodiment, there is provided an apparatus for recovering a cursor position. The apparatus includes: a cursor information storage unit that stores cursor information, which includes position information of a first cursor, in response to a cursor information storage message; and a cursor position recovery unit that recovers a position of a second cursor, which corresponds to the first cursor, based on the stored cursor information in response to a cursor information recovery message.

According to another exemplary embodiment, there is provided a method of recovering a cursor position. The method includes: storing cursor information, which includes position information of a first cursor, in response to a cursor information storage message; and recovering a position of a second cursor, which corresponds to the first cursor, based on the stored cursor information in response to a cursor information recovery message.

BRIEF DESCRIPTION OF THE DRAWINGS

The above and other features and advantages of the exemplary embodiments will become readily apparent from the following description with reference to the accompanying drawings, in which.

DESCRIPTION OF EXEMPLARY EMBODIMENTS

Advantages and features of the exemplary embodiments and methods of accomplishing the same may be understood more readily by reference to the following detailed description of exemplary embodiments and the accompanying drawings. The exemplary embodiments may, however, be embodied in many different forms and should not be construed as being limited to the exemplary embodiments set forth herein. Rather, these exemplary embodiments are provided so that this disclosure will be thorough and complete and will fully convey the concept to those skilled in the art, and the present invention will be defined by the appended claims. Expressions such as "at least one of," when preceding a list of elements, modify the entire list of elements and do not modify the individual elements of the list.

Hereinafter, the exemplary embodiments will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term 'unit' or 'module', as used herein, means, but is not limited to, a software or hardware component, such as a Field Programmable Gate Array (FPGA) or Application Specific Integrated Circuit (ASIC), which performs certain tasks. A unit or module may advantageously be configured to reside on the addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

The exemplary embodiments will now be described more fully with reference to the accompanying drawings.

Figure 1:
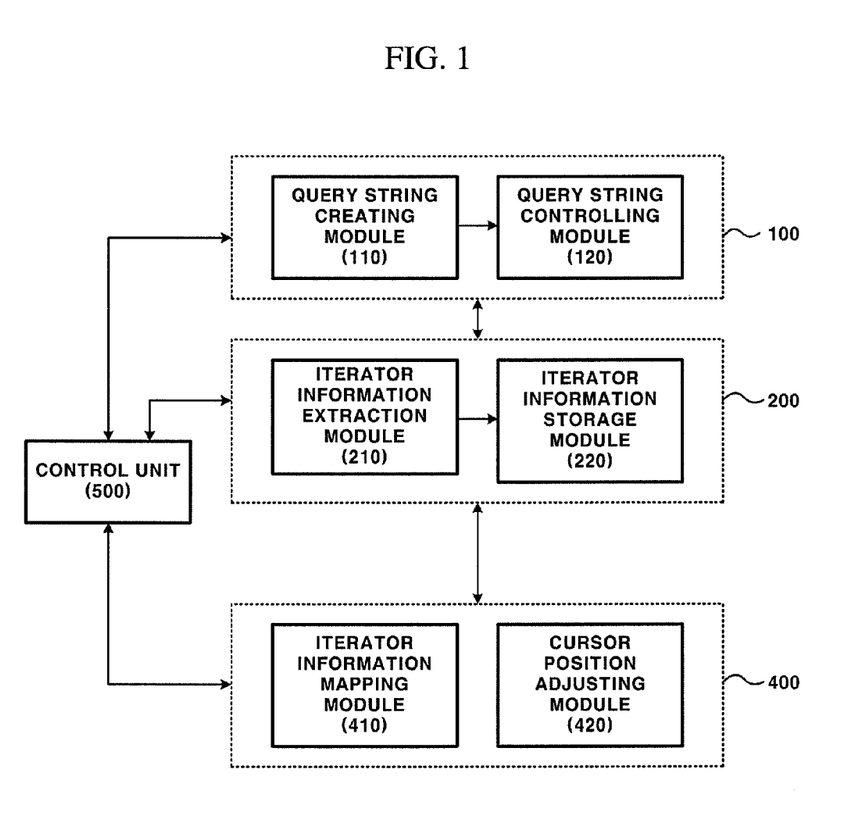
FIG. 1 is a block diagram of an apparatus for recovering a cursor position according to an exemplary embodiment.

FIG. 1 is a block diagram of an apparatus for recovering a cursor position according to an exemplary embodiment. Referring to FIG. 1, the cursor position recovering apparatus according to the current exemplary embodiment may include a query processing unit 100, a cursor information storage unit 200, and a cursor position recovery unit 400.

The cursor position recovering apparatus according to the current exemplary embodiment may operate in a digital device (not shown) having an embedded database management system (DBMS).

The query processing unit 100 creates and processes predetermined query strings in response to a cursor request message of a control unit 500. The query processing unit 100 may include a query string creating module 110, which creates query strings, and a query string controlling module 120, which processes the created query strings. Here, query strings are messages for requesting retrieval of specified data from an external source or an internal application, such as "Select content-id from Contents, Playlist, Fileposition where contents=Playlist and Fileposition>100."

The query string creating module 110 creates predetermined query strings in response to the cursor request message from the control unit 500. The query string creating module 110 may be a module that includes an application program of a general digital device having an embedded DBMS.

The query string controlling module 120 receives created query strings from the query string creating module 110, processes queries corresponding to the received query strings, and produces query processing results. Here, a cursor may be created to access the query processing results. A cursor is an object that can access data items or groups found as query processing results. For example, when content corresponding to a 'pop' genre is retrieved from content of an MP3 player, a cursor may be an object that can access the content corresponding to the 'pop' genre.

The query string controlling module 120 may include a common DBMS, but is not limited thereto. The query string controlling module 120 may also include a main memory DBMS.

The cursor information storage unit 200 may include an iterator information extraction module 210 and an iterator information storage module 220. The iterator information extraction module 210 extracts one or more iterators from a created cursor in order to construct cursor information. Here, an iterator refers to a request-based operator in a query execution plan tree, which will be described later. Cursor information refers to information needed to recover a cursor position. In addition, a cursor position refers to a position indicating data displayed on the screen of a device, such that a cursor can access the data among query processing results. Thus, if a cursor position is recovered, a data list, which appeared on a final display of a device when the device was turned off or in a sleep mode, can be displayed the same way on the screen of the device when in normal operation. Iterator information and cursor information will be described in detail later.

The iterator information storage module 220 stores one or more pieces of iterator information about one or more extracted iterators, respectively. The iterator information storage module 220 may store cursor information by storing the pieces of iterator information in a predetermined memory according to the setting of the control unit 500. Here, the predetermined memory may be a nonvolatile storage device such as a hard disk or a flash memory.

According to an exemplary embodiment, cursor information can be stored in a predetermined storage cycle as set by the control unit 500. Alternatively, the cursor information can also be stored for final-display recovery due to an interruption, such as abrupt power interruption (e.g., power interruption due to battery failure).

The cursor information storage unit 200 may store at least one piece of cursor information or a predetermined number of sets of cursor information according to the setting of the control unit 500.

The cursor position recovery unit 400 retrieves stored cursor information and recovers a cursor position in order to recover a final display of a device. The cursor position recovery unit 400 may include an iterator information mapping module 410 and a cursor position adjusting module 420.

The iterator information mapping module 410 may retrieve stored cursor information and map one or more pieces of iterator information contained in the retrieved cursor information respectively to one or more pieces of iterator information of a cursor that is to be created. The iterator information mapping module 410 may retrieve one or more pieces of iterator information stored in a serialized form and generate a query execution plan tree for a query. Then, the iterator information mapping module 410 may map one or more iterators respectively to one or more nodes of the generated query execution plan tree and map the pieces of iterator information respectively to the nodes of the generated query execution plan tree, thereby recovering a cursor position of a cursor that is to be created.

The cursor position adjusting module 420 changes the position of a cursor, which is to be created, when the position of the cursor cannot be recovered to a cursor position at the time of storing cursor information. For example, if the structure of a database is modified by deletion of data from or insertion of data into a storage unit when the position of a cursor is to be recovered, the position of the cursor, which is to be created, may be changed. In this case, the cursor position adjusting module 420 may adjust the position of the cursor to the position of a cursor that is to be recovered.

As described above, according to an exemplary embodiment, one or more iterators information are extracted based on the stored one or more pieces of iterator information. Thereafter, the stored pieces of iterator information are retrieved when a cursor position is to be recovered. Thus, the position of a cursor that is to be created can be quickly recovered using position information of each iterator. Furthermore, when a database is modified by, e.g., deletion of data, the position of the cursor that is to be created can be adjusted to the position of a cursor that is to be recovered.

Figure 2:
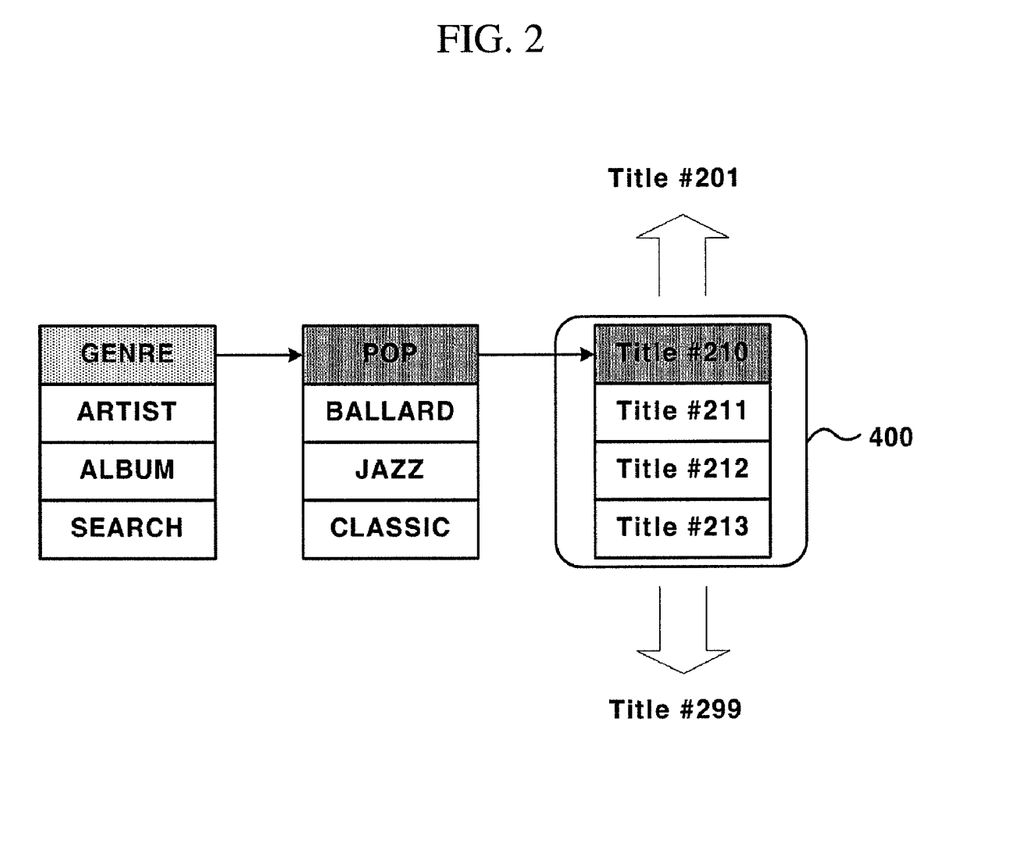
FIG. 2 is a schematic diagram illustrating the position of a cursor created as a result of query processing according to an exemplary embodiment.
Figure 3:
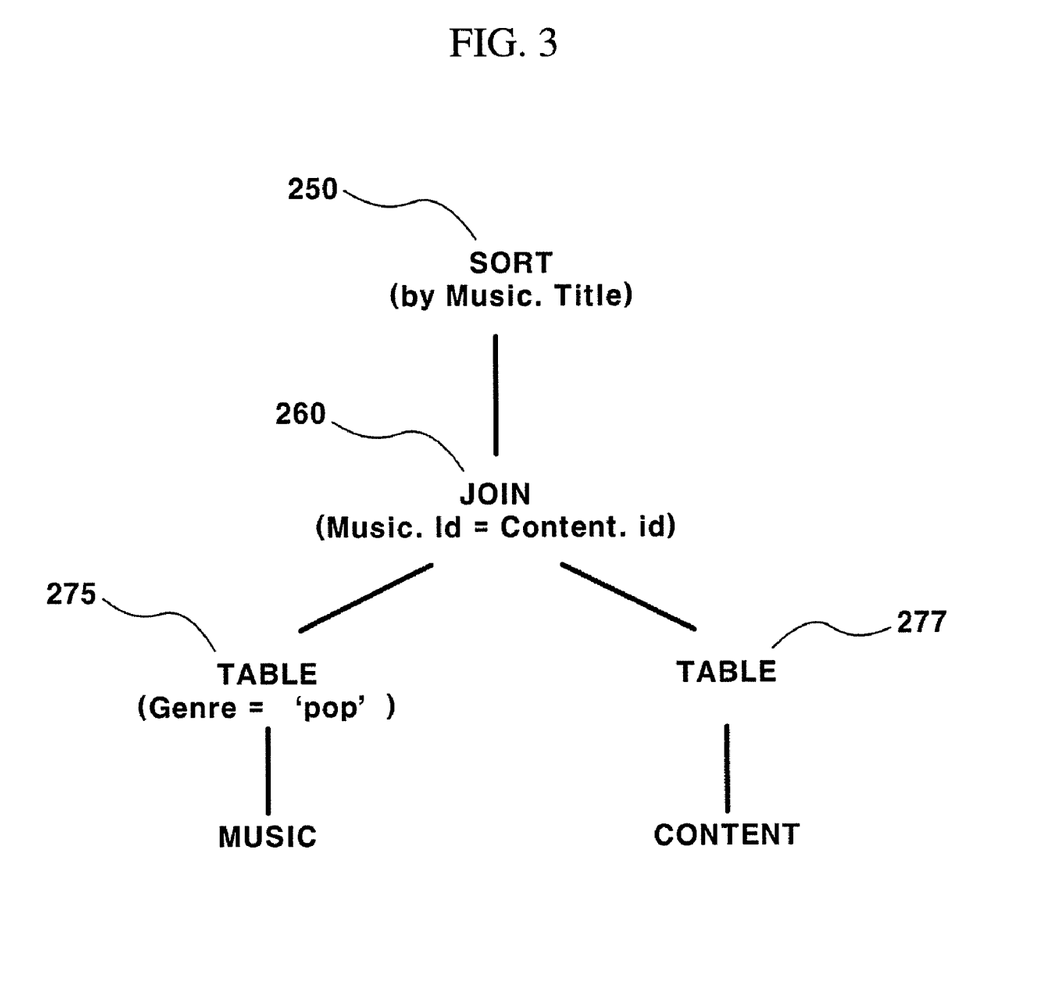
FIG. 3 is a diagram illustrating a query execution plan tree according to an exemplary embodiment.

FIG. 2 is a schematic diagram illustrating the position of a cursor created as a result of query processing according to an exemplary embodiment. FIG. 3 is a diagram illustrating a query execution plan tree according to an exemplary embodiment.

Referring to FIGS. 2 and 3, the query string controlling module 120 generates a query execution plan tree based on received query strings. For example, referring to FIG. 3, while browsing content stored in a device using metadata, a user may select "pop" as "genre." Accordingly, pieces of content, represented by titles #201 through #299, may be provided as query results. Using an input (e.g., up and down buttons), the user may play or select music represented by title #210, which is a tenth piece of content among the content found as the query results.

In this case, query strings may be, e.g., "Select Title from PlayListTable where genre='pop'", and a query execution plan tree may be generated as shown in FIG. 3. The query string controlling module 120 performing query processing generally comprises a query string parsing operation of converting an SQL statement into a format in a parser tree (not shown) to interpret query strings input in SQL, a logical query planning establishing operation of converting the query strings in the parser-tree format into a relational algebra format, and a physical-query-planning operation of materializing a logical plan tree into a physical plan tree.

Referring to FIG. 3, a query execution plan tree may be generated based on one or more query strings and have a tree structure composed of one or more nodes. Each node may be called an iterators, which operates as an operator in an exemplary embodiment.

In the query execution plan tree, a parent-child node structure may be repeated, and data may be iteratively requested to return query results to a root node at the top of the tree. For example, a parent node may request a child node to perform a task, and the child node assigned the task may deliver the task to its child node. Accordingly, a leaf node may perform the task by carrying out a specified operation and deliver the results to its parent node. This process is repeated until the query results are finally returned to the root node.

For example, referring to FIG. 3, a first leaf node 275 has a first table of 'music' where the records whose genre is 'pop' are selected, and a second leaf node 277 has a second table of 'content' among data. A join operator 260 may merge the first table of the first leaf node 275 with the second table of the second leaf node 277. Then, a sort operator at a final root node 250 may list the results of merging the first and second tables by title, thereby producing the pieces of content, represented by titles #201 through #299, as shown in FIG. 2.

When a cursor position indicates title #201 among the pieces of content provided as query results, the title number may gradually be increased by a command (externally, a 'fetch a next record' command) to return a next result record until the cursor position indicates title #210.

In the above example in which the cursor position moves downward from title #201, among the pieces of content provided as query results, when the title number is changed, information about one or more iterators shown in FIG. 3 may be changed. That is, since the position of a current cursor is constructed based on iterator information about each current iterator, the iterator information about each iterator (including iterator position information) may be stored. Then, the position of a cursor that is to be created may be recovered by setting the position of each iterator based on the stored iterator information. Accordingly, when a device is restarted after an abrupt power off or the sleep mode, its final display can be quickly recovered.

In an exemplary embodiment, a cursor used when cursor position information is stored will be referred to as a first cursor, and a cursor created when the cursor position information is recovered will be referred to as a second cursor.

The iterator information extraction module 210 extracts iterator information from cursor information of the first cursor of a digital device having an embedded DBMS being in normal operation, in response to the cursor request message. The extraction of n pieces of iterator information is performed by serializing the n pieces of iterator information by searching the query execution plan tree shown in FIG. 2.

The serializing of the iterator information is achieved by allocating numbers to the n pieces of iterator information existing at leaf nodes of a physical query execution plan tree for storing the position of the first cursor using the n pieces of iterator information contained in the physical query execution plan tree. The searching of the leaf nodes in the physical execution query plan tree is performed by at least one of a depth first search and breadth first search, thereby serializing the n pieces of iterator information.

The iterator information storage module 220 stores the n pieces of iterator information extracted by the iterator information extraction module 210 as the cursor information of the first cursor.

The iterator information mapping module 410 retrieves the n pieces of iterator information stored in the iterator information storage module 220 and performs mapping of the retrieved n pieces of iterator information to recover the position of the second cursor.

Figure 4:
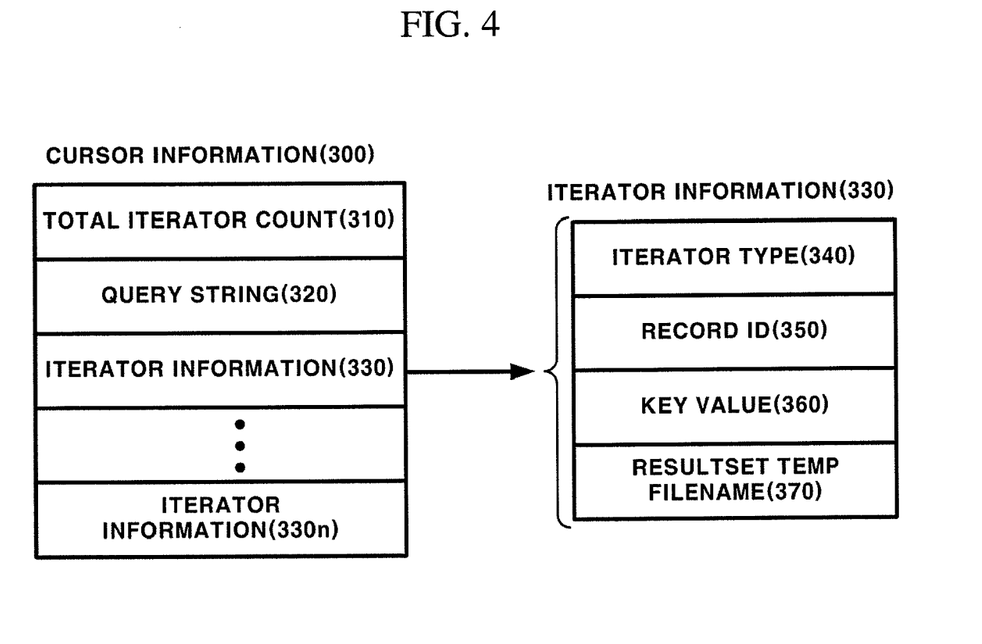
FIG. 4 is a diagram illustrating cursor information stored in the cursor position recovering apparatus of FIG. 1 according to an exemplary embodiment.

FIG. 4 is a diagram illustrating cursor information stored in the cursor position recovering apparatus of FIG. 1 according to an exemplary embodiment. Referring to FIG. 4, cursor information 300 is used to recover a cursor position such that a data list, which appeared on a final display of a device when the device was turned off or in the sleep mode, can be displayed substantially the same way on the screen of the device when in normal operation. Thus, the cursor information 300 may be stored in the cursor information storage unit 200 or may be used by the cursor position recovery unit 400 as recovery information when a cursor position is recovered.

The cursor information 300 contains a Total Iterator Count 310, a Query String 320 for which the query string creating module 100 requests query processing, and n pieces of Iterator Information 330 through 330n. Here, "n" is a natural number equal to or greater than one and indicates the number of iterators included in a query execution plan tree.

Each of the n pieces of Iterator Information 330 through 330n, for example the iterator information 330, contains information about a record indicated by a corresponding iterator, that is, iterator position information. In an exemplary embodiment, a cursor position may be represented by a combination of iterator positions. Thus, iterator information including iterator position information may be stored, and the position of a newly created cursor may be recovered using the stored iterator information. Here, the iterator position information may be represented differently according to iterator type. For example, the iterator position information may be represented by a record ID in the case of a table iterator, and by a key value and a record ID in the case of an index iterator. As described above, iterator position information is an identifier that indicates specified data in a database and thus is used to access the data.

The iterator information 330 may include an Iterator Type 340, a Record ID 350, a Key Value 360, and a ResultSet Temp FileName 370.

The Iterator Type 340 may be classified into the following three types.

First, a leaf node iterator is a node iterator located at the bottom of a query execution plan tree. Examples of the leaf node include an index iterator and a table iterator. The index iterator is an iterator for an indexed data structure, such as a tree or a hash, and the table iterator is an iterator for a record storage structure, such as a heap file.

An index iterator includes the Key Value 360 and the Record ID 350. The Key Value 360 is used to identify a position of data in the indexed data structure. The Key Value 360 is stored in the iterator information and is used to search for a position of data in performing query processing corresponding to predetermined query strings.

In a case where the Key Value 360 is stored in a duplicated manner in the indexed data structure, the Record ID 350 may be allocated to the Key Value 360 to search for a position of the Key Value 360.

The table iterator is an iterator used to directly search for data stored in the iterator information 330, and the Record ID 350 may store a position of a particular record.

That is, when a portable digital device normally operates, the table iterator may include the Record ID 350 in which a record is stored for iterator position recovery, the Key Value 360 of a current cursor position, and the ResultSet Temp FileName 370 generated when the currently generated iterator is stored in a temporary file.

The second type is an internal node iterator located within the query execution plan tree. For example, a join iterator, which merges results received from two child nodes, may be an internal node iterator. Examples of the join iterator include a nested loop join iterator, an index-based nested loop join iterator, a merge join iterator, and a hash join iterator. There are also internal node iterators which merge results received from child nodes into a single record, such as an aggregation iterator and a duplicate-elimination iterator.

The third type is a materialized iterator which materializes entire intermediate results in a disk memory and retrieves records from the disk memory. The materialized iterator is an internal node iterator. However, since the materialized iterator itself has all the result records, it operates like a leaf node iterator. Examples of the materialized iterator include a sort iterator.

Figure 5:
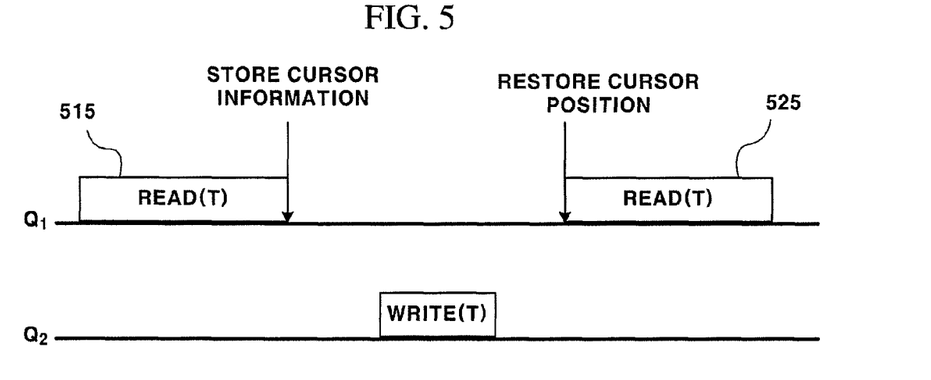
FIG. 5 is a schematic diagram illustrating the operation of the cursor position recovering apparatus of FIG. 1 according to an exemplary embodiment.

FIG. 5 is a schematic diagram illustrating the operation of the cursor position recovering apparatus of FIG. 1 according to an exemplary embodiment. Referring to FIG. 5, in an exemplary embodiment, a cursor position can be recovered by reflecting modification of data in real time. For example, in a browsing query, if a write operation is performed between read operations due to insertion and/or deletion of data, a technique for recovering a cursor position in the event of modification of data may be considered.

In the browsing query, cursor information may be stored when a first read query 515 is terminated and may be retrieved when a second read query 525 starts, in order to recover a cursor position.

When the position of a second cursor that is created cannot be recovered to the position of a first cursor, due to modification of a database resulting from deletion or insertion of data between the storage and retrieval of the cursor information, the position of the second cursor can be adjusted and thus recovered to an appropriate position.

Furthermore, since the position of the second cursor is recovered by storing and retrieving a relatively small amount of cursor information, a device can operate rapidly without being overloaded.

Figure 6:
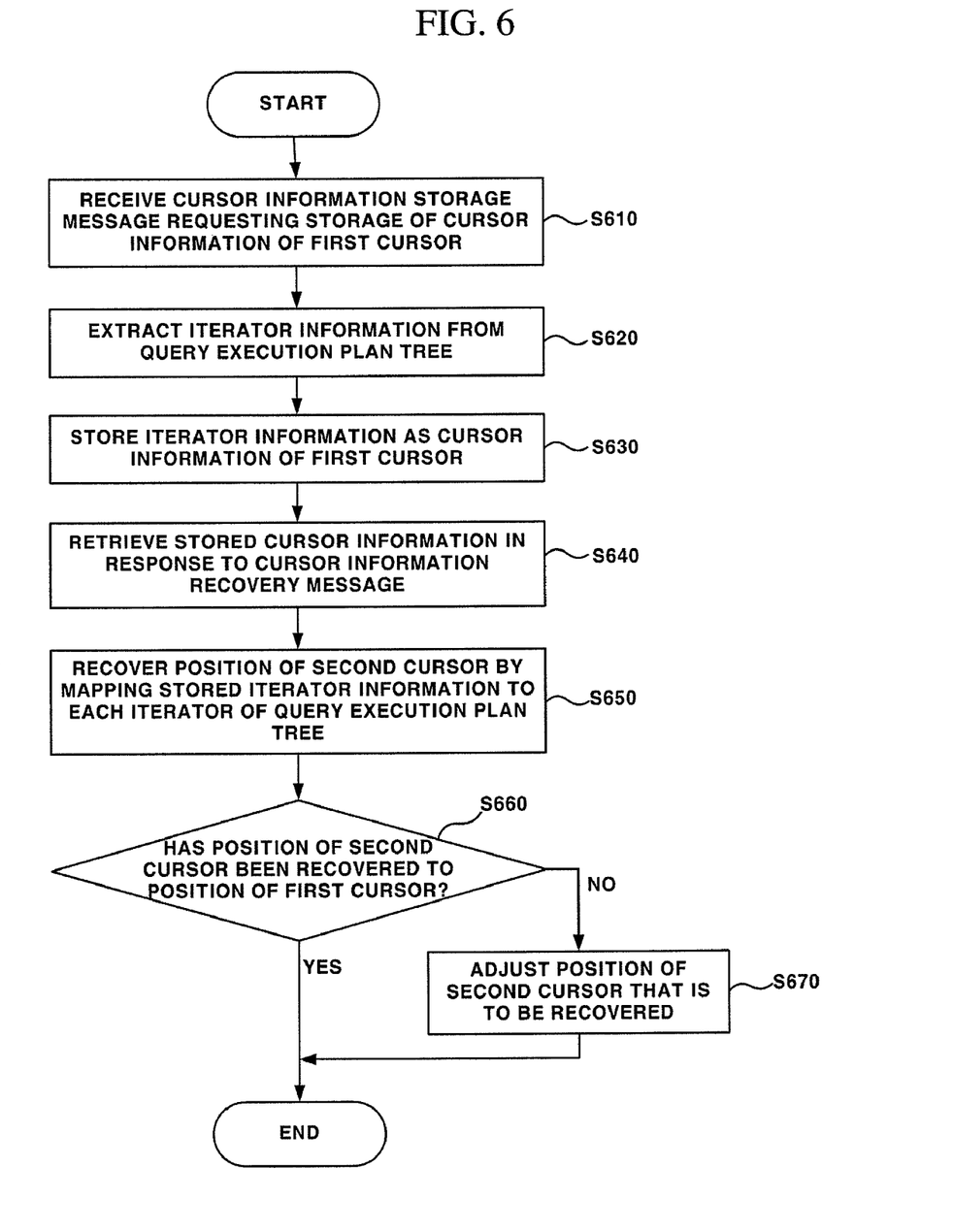
FIG. 6 is a flowchart illustrating a method of recovering a cursor position according to an exemplary embodiment.

FIG. 6 is a flowchart illustrating a method of recovering a cursor position according to an exemplary embodiment.

Referring to FIG. 6, a cursor information storage message requesting storage of cursor information of a first cursor is received from the control unit 500 (operation S610). The cursor information storage unit 200 extracts one or more pieces of iterator information, respectively about one or more iterators, from a query execution plan tree generated based on query strings (operation S620). Each piece of iteration information may include an iterator type and iterator position information which indicates a record in a database.

The cursor information storage unit 200 stores the pieces of iterator information as the cursor information of the first cursor in a storage unit (not shown) (operation S630).

Later, the stored cursor information is retrieved in response to a cursor information recovery message requesting recovery of a cursor position (operation S640).

In response to the cursor information recovery message, the cursor position recovery unit 400 generates a query execution plan tree based on the query strings contained in the stored cursor information and maps the retrieved pieces of iterator information to one or more iterators, which correspond respectively to one or more nodes of the generated query execution plan tree (operation S650). Accordingly, the position of a second cursor that is created can be recovered to the position of the first cursor.

In another example, the cursor position recovery unit 400 reads the stored cursor information, extracts from the read cursor information the query execution plan tree and the pieces of iterator information corresponding to one or more nodes of the extracted query execution plan tree, and maps the extracted pieces of iterator information to the nodes of the extracted query execution plan tree. Accordingly, the position of the second cursor that is created can be recovered to the position of the first cursor.

Next, it is determined whether the position of the second cursor has been recovered to the position of the first cursor (operation S660). The cursor position recovery unit 400 reads the stored cursor information and adjusts the position of the second cursor when the position of the second cursor cannot be recovered to the position of the first cursor (operation S670). Adjusting the position of the second cursor will be described in more detail later.

As described above, in an exemplary embodiment, only cursor information containing one or more pieces of iterator information about one or more iterators is stored in a portable digital device environment in which power is frequently turned on/off. Thus, a storage process for recovering a cursor position can be simplified. In addition, a cursor position is recovered based on the stored cursor information. That is, the cursor position can be quickly recovered using a small amount of recovery data. Furthermore, since the position of a cursor that is to be recovered is adjusted when a database is modified by deletion or insertion of data, modification of data can be adaptively handled.

Figure 7:
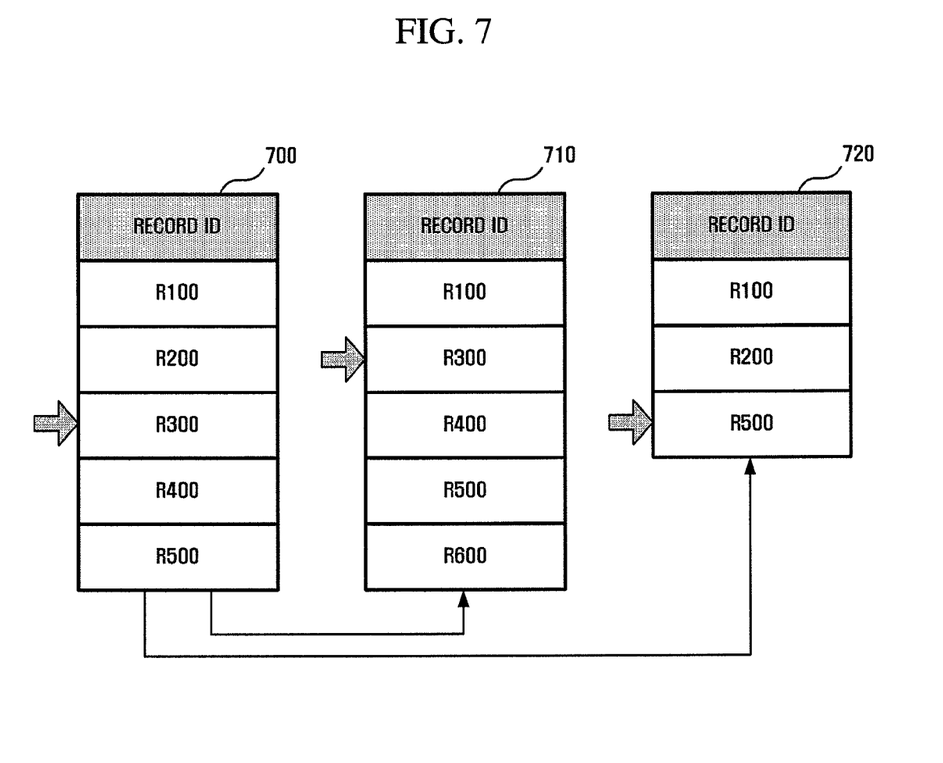
FIG. 7 is a diagram illustrating position adjustment of a table iterator in recovery of a cursor position according to an exemplary embodiment.

FIG. 7 is a diagram illustrating position adjustment of a table iterator in recovery of a cursor position according to an exemplary embodiment. Referring to FIG. 7, in each of first through third result tables 700 through 720, the position of a table iterator may be determined by a record ID.

The first result table 700 is in an initial state before data is deleted from or inserted into a database, and the position of the table iterator indicates a record ID of R300. In response to a cursor information storage message, position information of the table iterator indicating the record ID R300 may be stored as table iterator information.

Thereafter, when data indicating a record ID 8200 is deleted from the database and data indicating a record ID R600 is added to the database, the first result table 700 may be changed to the second result table 710. Here, when a cursor position is to be recovered using the stored table iterator information in response to a cursor information recovery message, the position of the table iterator indicating the record ID R300 in the first result table 700 must be changed due to deletion of the data indicating the record ID R200 from the database and insertion of the data indicating the record ID R600 into the database. In this case, the cursor position adjusting module 420 may change the position of the table iterator to a new position indicating the record ID R300 as in the second result table 710, thereby adjusting the cursor position. As described above, in an exemplary embodiment, when a position indicating a specified record ID is changed, the position of a table iterator is changed to a position indicated by the specified record ID.

In another example, when data indicating the record ID R300 and data indicating the record ID R400 are deleted from the database, the first result table 700 may be changed to the third result table 720. Here, when the cursor position is to be recovered using the stored table iterator information, in response to the cursor information recovery message, the current position of the table iterator must be changed since the table iterator cannot indicate the record ID R300 due to deletion of the data indicating the record ID R300 and the data indicating the record ID R400 from the database. In an exemplary embodiment, when data indicating a specified record ID is deleted from a database, the position of a table iterator is adjusted to a position indicating a next record ID of the deleted specified record ID. Therefore, the position of the table iterator is adjusted to indicate a next record ID of R500 in the third result table 720 from which record IDs of R300 and R400 have been deleted.

While adjusting the position of a table iterator has been described above, a cursor position, which is determined by a combination of table iterator positions, may also be adjusted by the adjustment of the position of the table iterator. That is, when table iterator information is changed by deletion of data to or addition of data from a database, the adjustment of the position of a table iterator may lead to the adjustment of a cursor position. In addition, the process of adjusting an iterator has been described above using a table iterator as an example. However, in an exemplary embodiment, the same process can be applied to various iterators.

Figure 8:
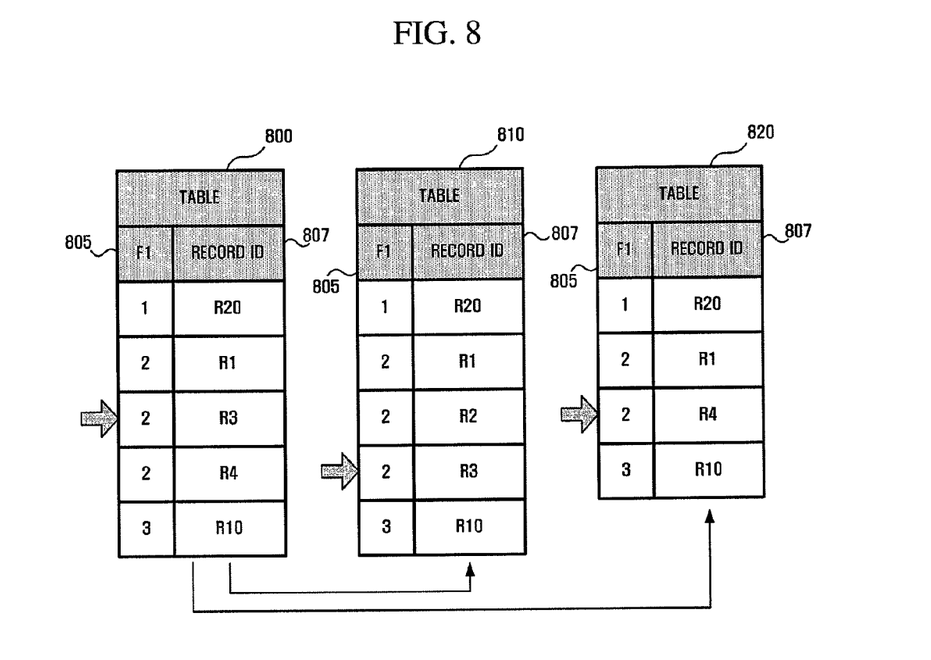
FIG. 8 is a diagram illustrating position adjustment of an index iterator in recovery of a cursor position according to an exemplary embodiment.

FIG. 8 is a diagram illustrating position adjustment of an index iterator in recovery of a cursor position according to an exemplary embodiment. Referring to FIG. 8, in each of first through third index result tables 800 through 820, the position of an index iterator may be determined by a key value 805 and a record ID 807.

The first index result table 800 is in an initial state of a database before data is deleted from or inserted into the database, and the position of the index iterator indicates (2, R3). In response to a cursor information storage message, position information of the index iterator indicating (2, R3) may be stored as index iterator information.

Thereafter, when data indicating (2, R2) is inserted into the database and data indicating (2, R4) is deleted from the database, the first index result table 800 may be changed to the second index result table 810. Here, when a cursor position is to be recovered using the stored index iterator information, in response to a cursor information recovery message, the position of the index iterator indicating (2, R3) in the first index result table 800 must be changed due to insertion of the data indicating (2, R2) into the database and deletion of the data indicating (2, R4) from the database. In this case, the cursor position adjusting module 420 may adjust the position of the index iterator to a new position indicating (2, R3), as in the second index result table 810.

In another example, when data indicating (2, R3) is deleted from the database, the first index result table 800 may be changed to the third index result table 820. Here, when the cursor position is to be recovered using the stored index iterator information, in response to the cursor information recovery message, the index iterator cannot indicate (2, R3) due to deletion of the data indicating (2, R3) from the database. Therefore, when a specified position is deleted, the position of the index iterator may be changed to a next position of the deleted specified position. In the case of a cursor position determined by a combination of iterator positions, when a data field at a specified cursor position is deleted, a cursor is moved to a next position of the specified position.

Figure 9A:
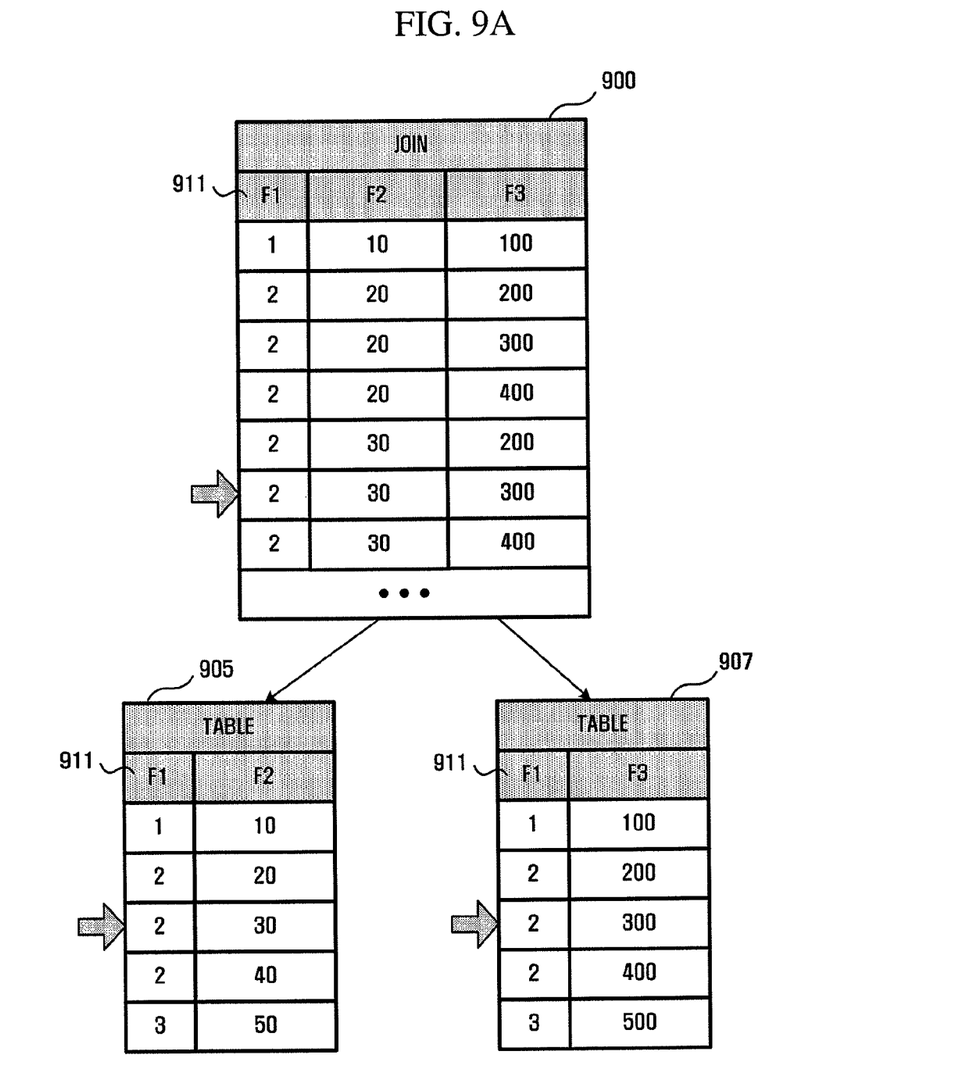
FIGS. 9A through 9C are diagrams illustrating position adjustment of a join iterator in recovery of a cursor position according to an exemplary embodiment.
Figure 9B:
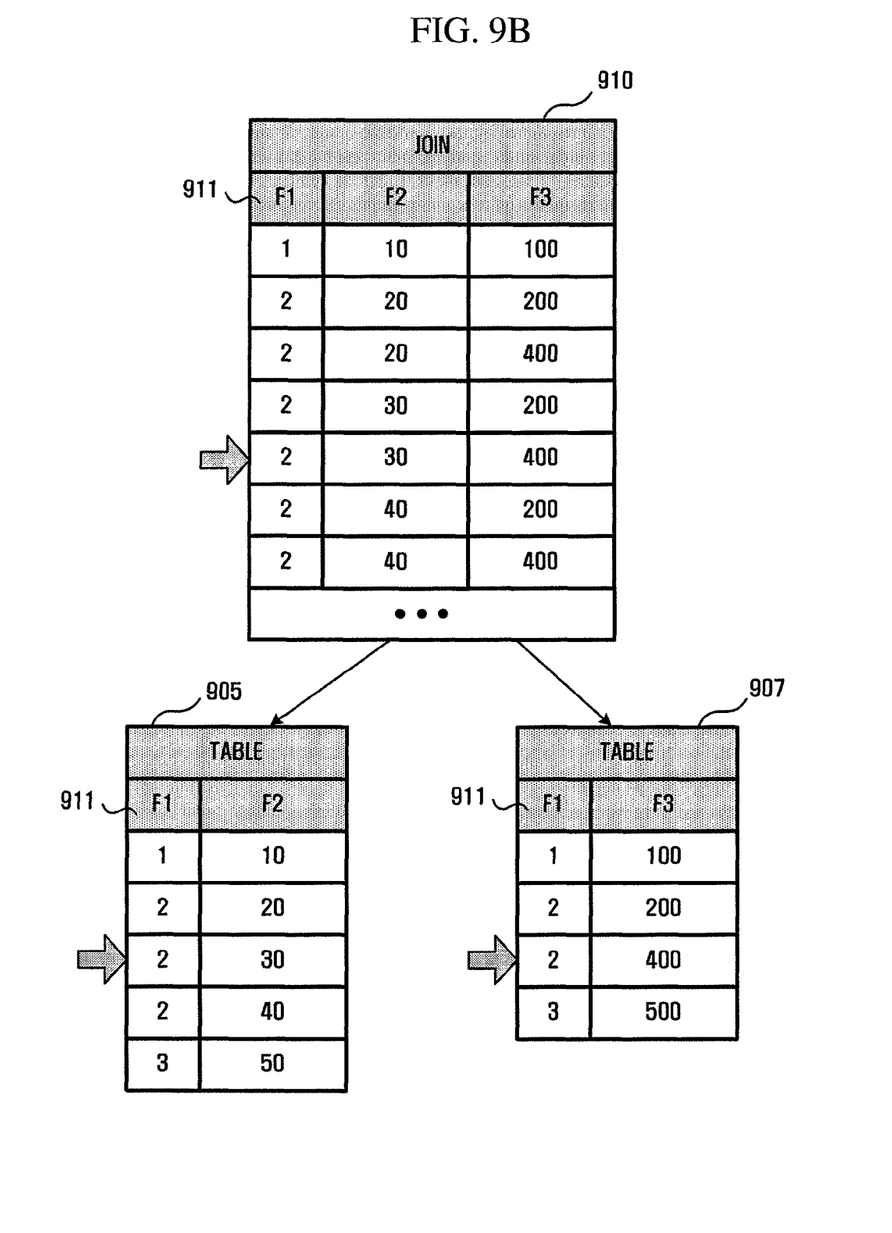
Figure 9C:
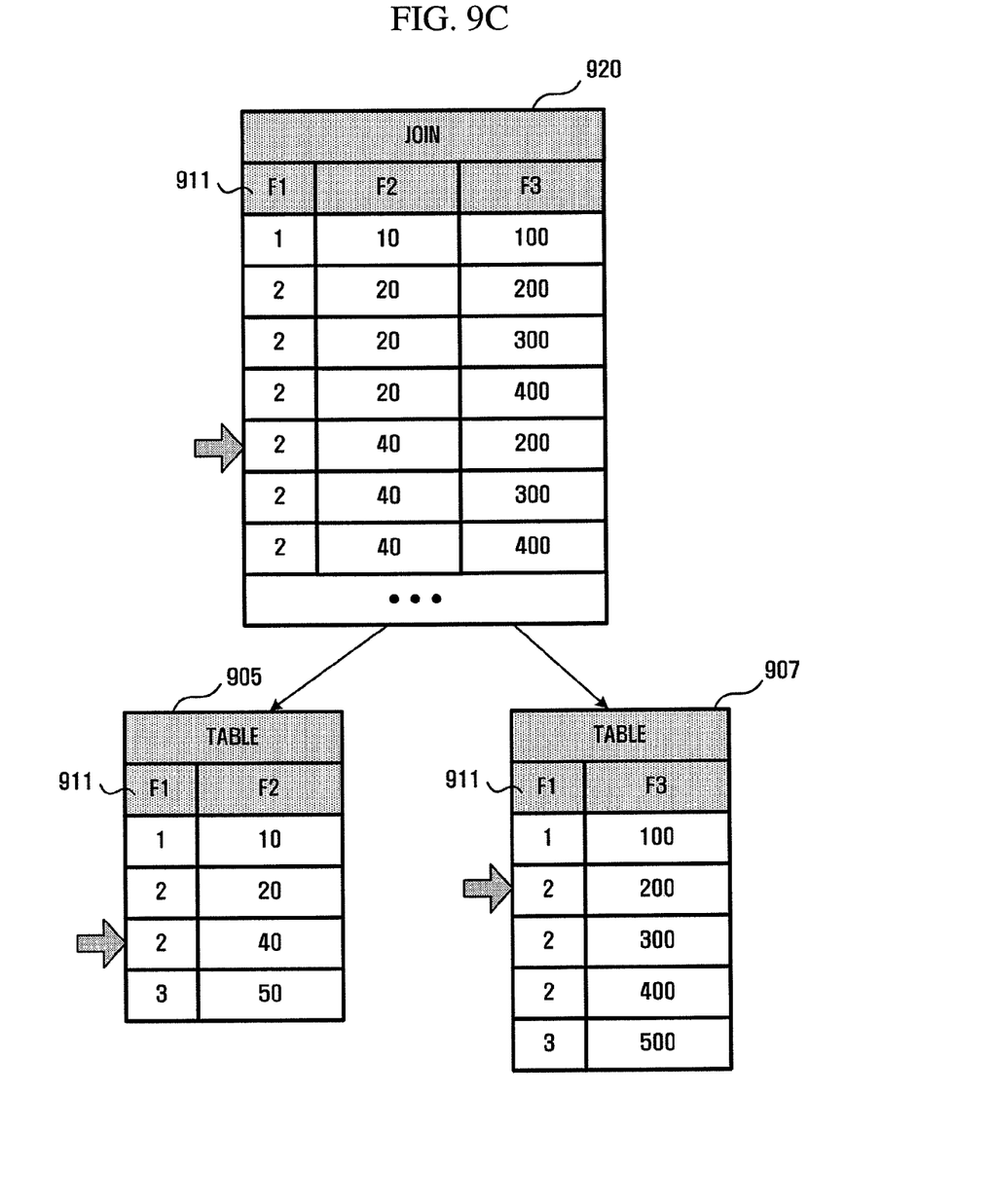

FIGS. 9A through 9C are diagrams illustrating position adjustment of a join iterator in recovery of a cursor position according to an exemplary embodiment.

Referring to FIG. 9A, a join iterator is an internal iterator created by merging index iterators located at two child nodes. A join key 911 may be used as a medium to merge the two index iterators. When the join key 911 of one of the child nodes is identical to that of the other child node, first and second index result tables 905 and 907 of the two child nodes can be merged with each other.

For example, when the join key 911 is '2,' index indicators (2, 20), (2, 30), and (2, 40) of the first index result table 905 may be merged with index indicators (2, 200), (2, 300), and (2, 400) of the second index result table 907 to create nine join records of (2, 20, 200), (2, 20, 300), (2, 20, 400), (2, 30, 200), (2, 30, 300), (2, 30, 400), (2, 40, 200), (2, 40, 300), and (2, 40, 500) in join result table 900. Meanwhile, the position of the index iterator may indicate (2, 30) in the first index result table 905, the position of the index iterator may indicate (2, 300) in the second index result table 907, and the position of the join iterator may indicate (2, 30, 300) in join result table 900.

Referring to FIG. 9B, when data indicating (2, 300) is deleted from second index result table 907 and the first index result table 905 remains unchanged, the position of the index iterator in the second index result table 907 is adjusted to indicate (2, 400), which is a next position of the deleted position of the deleted data. Accordingly, the position of the index iterator indicates (2, 30) in the first index result table 905, the position of the index iterator indicates (2, 400) in the second index result table 907, and the position of the join iterator indicates (2, 30, 400) in a second join result table 910.

In another example, referring to FIG. 9C, data indicating (2, 30) has been deleted from the first index result table 905 and the second index result table 907 has remained unchanged. In this case, since the data indicating (2, 30) has been deleted from the first index result table 905, the number of join records in the third join result table 920 corresponding to the join key 911 of '2' is reduced to six, that is, (2, 20, 200), (2, 20, 300), (2, 20, 400), (2, 40, 200), (2, 40, 300), and (2, 40, 500). When the data indicating (2, 30) in the first index result table 905 is deleted as described above, the position of the join iterator may be adjusted to (2, 40, 200) which is a next position of a position in the third join result table 920 before the deletion of the data indicating (2, 30). Consequently, the position of the index iterator indicates (2, 40) in the first index result table 905, the position of the index iterator indicates (2, 200) in the second index result table 907, and the position of the join iterator indicates (2, 40, 200) in the third join result table 920.

As described above, in the case of an internal iterator (such as a join iterator), created by merging result tables of two child nodes, the position of a cursor created after modification of data in response to a cursor position recovery message may be determined by the position of the iterator which is determined by a combination of the child nodes. For example, when the position of the cursor cannot be recovered due to the change in the position of an iterator of any one of the child nodes, it may be adjusted to a next position of a position determined by a combination of the child nodes before the change in the position of the iterator. Accordingly, the position of the cursor can be easily adjusted in the event of modification of data.

As described above, in an exemplary embodiment, when the position of a cursor that is to be recovered cannot be recovered to a position at the time of storing cursor information due to modification of data, the position of the cursor can be adjusted to an appropriate position. Thus, even when a modification is made to data in a database, the position of the cursor can be recovered to an appropriate position.

While the exemplary embodiments have been particularly shown and described, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and all modifications within the meaning and scope of the claims and their equivalents will be construed as being included in the present invention.

What is claimed is:

1. An apparatus for recovering a cursor position, the apparatus comprising:
    a storage unit which stores cursor information, which comprises position information of a first cursor, in response to a cursor information storage message; and
    a cursor position recovery unit which receives a cursor information recovery message that requests the apparatus to recover a position of the first cursor in a list of search results of a database query of a database, the position being a record in the list at a time when the database query is terminated, and recovers a position of a second cursor, which corresponds to the first cursor, based on the stored cursor information, in response to receiving the cursor information recovery message,
    wherein the cursor information comprises query strings and at least one piece of iterator information about at least one iterator extracted from a query execution plan tree which is generated based on the query strings.

2. A method of recovering a cursor position, the method comprising:
    storing cursor information, which comprises position information of a first cursor, in response to a cursor information storage message;
    receiving a cursor information recovery message that requests recovery of a position of the first cursor in a list of search results of a database query of a database, the position being a record in the list at a time when the database query is terminated; and
    recovering a position of a second cursor, which corresponds to the first cursor, based on the stored cursor information, in response to receiving the cursor information recovery message,
    wherein the cursor information comprises query strings and at least one piece of iterator information about at least one iterator extracted from a query execution plan tree which is generated based on the query strings.

3. The apparatus of claim 1, wherein one of the at least one piece of iteration information comprises at least one of an iterator type and iterator position information which is an identifier indicating specified data.

4. The apparatus of claim 1, wherein when the position of the second cursor cannot be recovered to a position of the first cursor, the cursor position recovery unit adjusts the position of the second cursor and moves the second cursor to the adjusted position.

5. The apparatus of claim 1, wherein the cursor position recovery unit recovers the position of the second cursor by generating the query execution plan tree based on the query strings contained in the stored cursor information and maps the at least one piece of iterator information to at least one node of the generated query execution plan tree.

6. The apparatus of claim 1, wherein the cursor position recovery unit recovers the position of the second cursor by extracting a query execution plan tree and the at least one piece of iterator information, which corresponds to at least one node of the extracted query execution plan tree, from the stored cursor information.

7. The apparatus of claim 1, further comprising a query string controlling module creating the first cursor based on the query strings, which are created in response to a cursor request message, and returning the first cursor.

8. The apparatus of claim 1, wherein the cursor information storage unit comprises:
    an iterator information extraction unit which serializes the at least one piece of iterator information, which constitutes the cursor information, and extracts the at least one piece of iterator information; and
    an iterator information storage module which stores the extracted at least one piece of iterator information.

9. The method of claim 2, wherein one of the at least one piece of iteration information comprises at least one of an iterator type and iterator position information which is an identifier indicating specified data.

10. The method of claim 2, wherein when the position of the second cursor cannot be recovered to a position of the first cursor, the recovering of the position of the second cursor comprises adjusting the position of the second cursor and moving the second cursor to the adjusted position.

11. The method of claim 2, wherein the recovering of the position of the second cursor comprises recovering the position of the second cursor by generating a query execution plan tree based on the query strings contained in the stored cursor information and mapping the at least one piece of iterator information to at least one node of the generated query execution plan tree.

12. The method of claim 2, wherein the recovering of the position of the second cursor comprises recovering the position of the second cursor by extracting a query execution plan tree and the at least one piece of iterator information, which corresponds to at least one node of the extracted query execution plan tree, from the stored cursor information.

13. The apparatus of claim 4, wherein when a record corresponding to the position of the first cursor is deleted, the cursor position recovery unit changes the position of the second cursor, which is to be recovered, to a position of a next record of the deleted record.

14. The apparatus of claim 4, wherein when a position of the record corresponding to the position of the first cursor is changed, the cursor position recovery unit changes the position of the second cursor, which is to be recovered, to the changed position of the record.

15. The apparatus of claim 5, wherein when the position of the second cursor cannot be recovered to the position of the first cursor, the cursor position recovery unit adjusts the position of the second cursor by adjusting a position of the at least one iterator corresponding to the at least one node of the generated query execution plan tree.

16. The apparatus of claim 15, wherein when the at least one iterator is a leaf node of the generated query execution plan tree and when a record corresponding to a position of the at least one iterator of the leaf node is deleted, the cursor position recovery unit changes the position of the at least one iterator of the leaf node to a position of a next record of the deleted record.

17. The apparatus of claim 15, wherein when the at least one iterator is an internal node of the generated query execution plan tree and when a record corresponding to a position of an iterator of one of child nodes of the internal node is deleted, the cursor position recovery unit changes the position of the at least one iterator to a next position of a position before the deletion of the record, among positions determined by combinations of the child nodes of the internal node.

18. The apparatus of claim 8, wherein the cursor position recovery unit comprises an iterator information mapping module which maps the extracted at least one piece of iterator information to one or more pieces of iterator information of the second cursor in response to the cursor information recovery message.

19. The method of claim 10, wherein when a record corresponding to the position of the first cursor is deleted, the recovering of the position of the second cursor comprises changing the position of the second cursor, which is to be recovered, to a position of a next record of the deleted record.

20. The method of claim 10, wherein a record corresponding to the position of the first cursor is changed, the recovering of the position of the second cursor comprises changing the position of the second cursor, which is to be recovered, to the changed position of the record.

21. The method of claim 11, wherein when the position of the second cursor cannot be recovered to the position of the first cursor, the recovering of the position of the second cursor further comprises adjusting the position of the second cursor by adjusting a position of the at least one iterator corresponding to the at least one node of the generated query execution plan tree.

22. The method of claim 21, wherein when the at least one iterator is a leaf node of the generated query execution plan tree and when a record corresponding to a position of the at least one iterator of the leaf node is deleted, the recovering of the position of the second cursor further comprises changing the position of the at least one iterator of the leaf node to a position of a next record of the deleted record.

23. The method of claim 21, wherein when the at least one iterator is an internal node of the generated query execution plan tree and when a record corresponding to a position of an iterator of one of child nodes of the internal node is deleted, the recovering of the position of the second cursor comprises changing the position of the at least one iterator to a next position of a position before the deletion of the record, among positions determined by combinations of the child nodes of the internal node.

* * * * *